US007278846B2

(12) United States Patent
Chen

(10) Patent No.: US 7,278,846 B2
(45) Date of Patent: Oct. 9, 2007

(54) VIVID THREE-DIMENSIONAL ILLUSTRATED CARD TOOL SET

(76) Inventor: Teng-Kuei Chen, 11Fl., No. 63, Lane 122, Sec. 4, Jen-Ai Rd., Taipei (TW)

(*) Notice: Subject to any disclaimer, the term of this patent is extended or adjusted under 35 U.S.C. 154(b) by 393 days.

(21) Appl. No.: 11/119,314

(22) Filed: Apr. 28, 2005

(65) Prior Publication Data

US 2006/0246165 A1 Nov. 2, 2006

(51) Int. Cl.
*B29C 53/08* (2006.01)

(52) U.S. Cl. ...................... 425/317; 425/318; 425/392; 425/472

(58) Field of Classification Search ................ 425/317, 425/318, 392–393, 472; 72/31.04, 127, 152, 72/369, 380
See application file for complete search history.

(56) References Cited

U.S. PATENT DOCUMENTS 3,267,716 A * 8/1966 Hales .......................... 72/384
3,360,018 A * 12/1967 Lindsay ........................ 72/293
4,091,845 A * 5/1978 Johnson ........................ 72/217
4,331,183 A * 5/1982 Calhoun .................. 72/409.01
6,094,957 A * 8/2000 Masunaga et al. ............ 72/128

* cited by examiner

*Primary Examiner*—Yogendra N. Gupta
*Assistant Examiner*—Thu Khanh T. Nguyen
(74) *Attorney, Agent, or Firm*—James H. Walters

(57) ABSTRACT

A tool set for bending a semi-finished decoration with a straight wire into a finished decoration with a bent wire and attaching the decoration to an printed ink layer on a base of an illustrated card has a die mold and a hand-held tool. The die mold has a top edge, two notches defined in the top edge and a through hole defined vertically through the die mold. The hand-held tool has two ends, a bending die with an alignment notch in one end and a clamp with a clamping notch on the other end. The tool set quickly bends the semi-finished decoration and attaches the finished decoration tightly to the printed ink layer on the base.

6 Claims, 9 Drawing Sheets

VIVID THREE-DIMENSIONAL ILLUSTRATED CARD TOOL SET

BACKGROUND OF THE INVENTION

1. Field of the Invention

The present invention relates to a tool set, and more particularly to a vivid three-dimensional illustrated card tool set.

2. Description of Related Art

Illustrated cards such as greeting cards and Christmas cards are popular.

One type of conventional illustrated card has a base and provides three-dimensional effect by attaching small, u-shaped wire, decorations to the base to enhance features on the card and make the illustrated card more vivid. However, the decorations have to be fabricated and installed manually on the base. The fabrication and installation of the decorations is tedious and time-consuming.

To overcome the shortcomings, the present invention provides a vivid three-dimensional illustrated card tool set for assembling a vivid three-dimensional illustrated card to mitigate or obviate the aforementioned problems.

SUMMARY OF THE INVENTION

The main objective of the invention is to provide a tool set to form decorations for an illustrated card and attach the decorations tightly to a base of the illustrated card so the illustrated card looks vivid.

A tool set in accordance with the present invention bends a semi-finished decoration, attaches a finished decoration to an illustrated card and has a die mold and a hand-held tool. The semi-finished decoration is fundamentally a straight pliable wire, and the finished decoration is fundamentally a bent wire.

The die mold has a top edge, two notches and a through hole. The notches are defined in the top edge, and the through hole is defined vertically through the die mold.

The hand-held tool has two ends, a bending die and a clamp. The bending die is formed on one end and has an alignment notch. The clamp is formed on the other end and has a clamping notch.

Other objectives, advantages and novel features of the invention will become more apparent from the following detailed description when taken in conjunction with the accompanying drawings.

DETAILED DESCRIPTION OF THE PREFERRED EMBODIMENT

Figure 6:
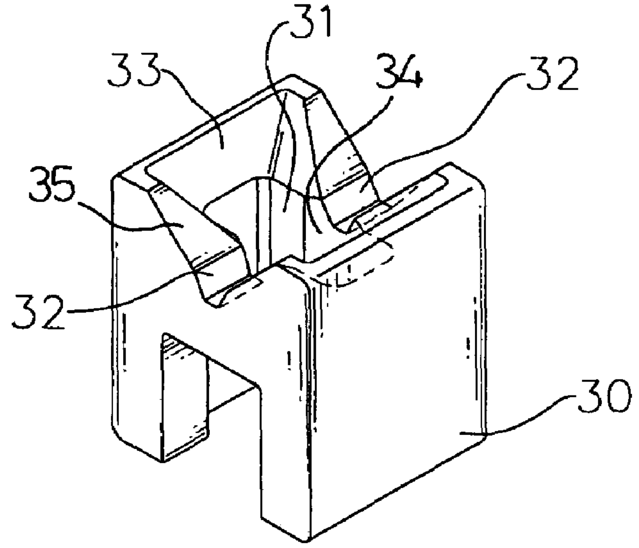
FIG. 6 is a perspective view of a die mold of a vivid 3D illustrated card tool set in accordance with the present invention.
Figure 8:
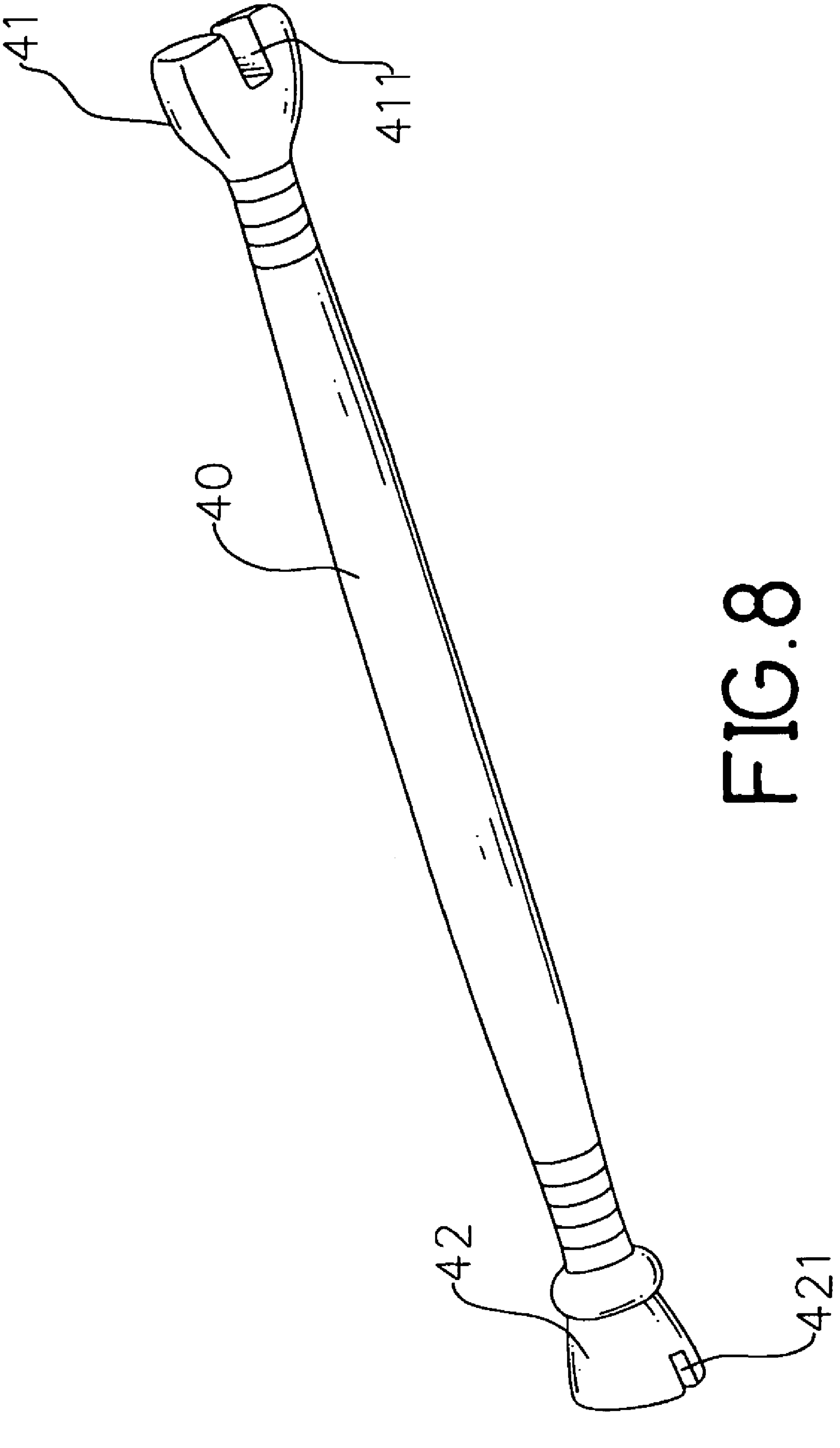
FIG. 8 is a perspective view of a hand-held tool of the vivid 3D illustrated card tool set in accordance with the present invention.

With reference to FIGS. 6 and 8, a vivid three-dimensional (3D) illustrated card tool set in accordance with the present invention comprises a die mold (30) and a hand-held tool (40).

Figure 1:
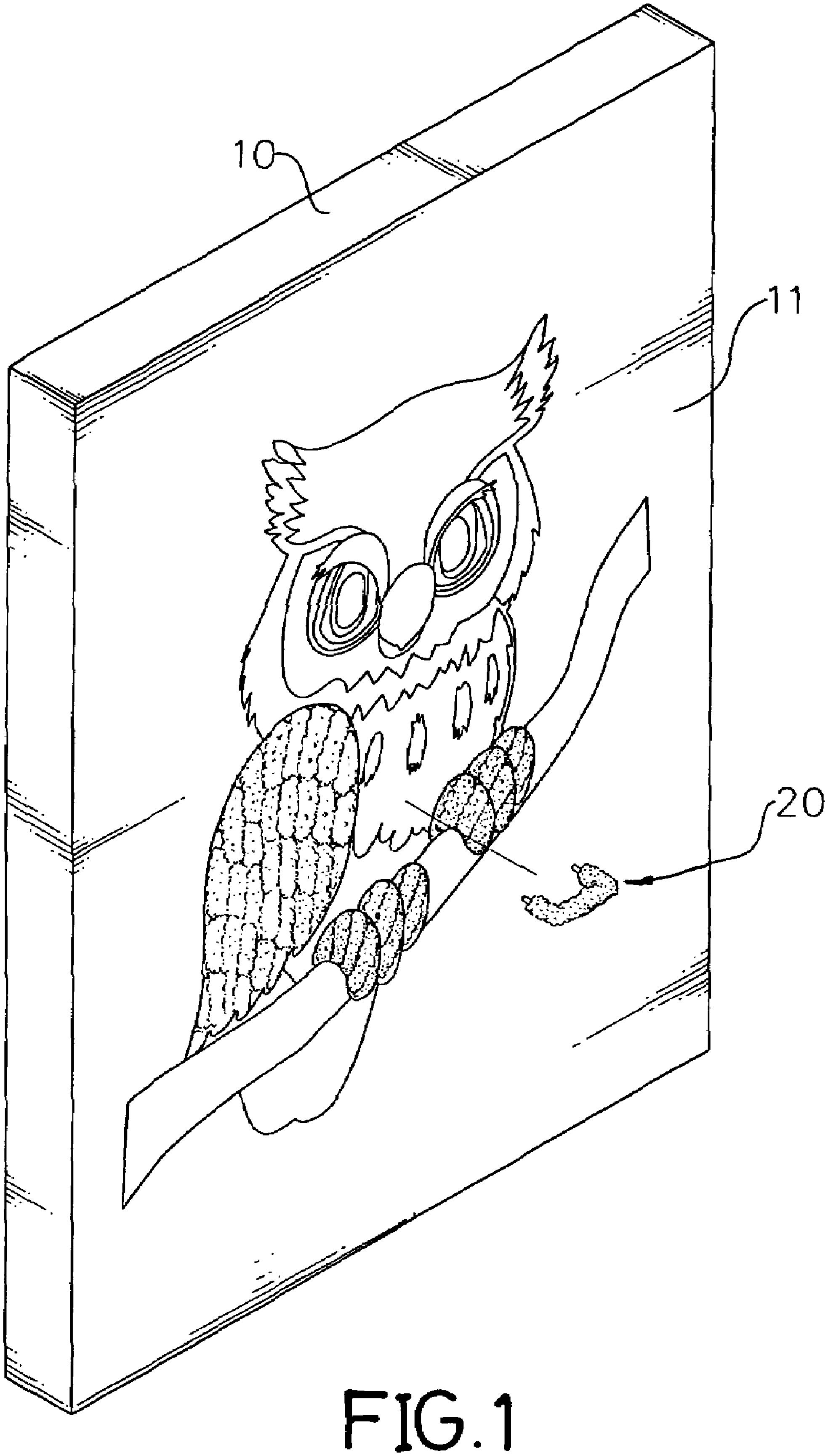
FIG. 1 is a perspective view of a vivid three-dimensional (3D) illustrated card.
Figure 2:
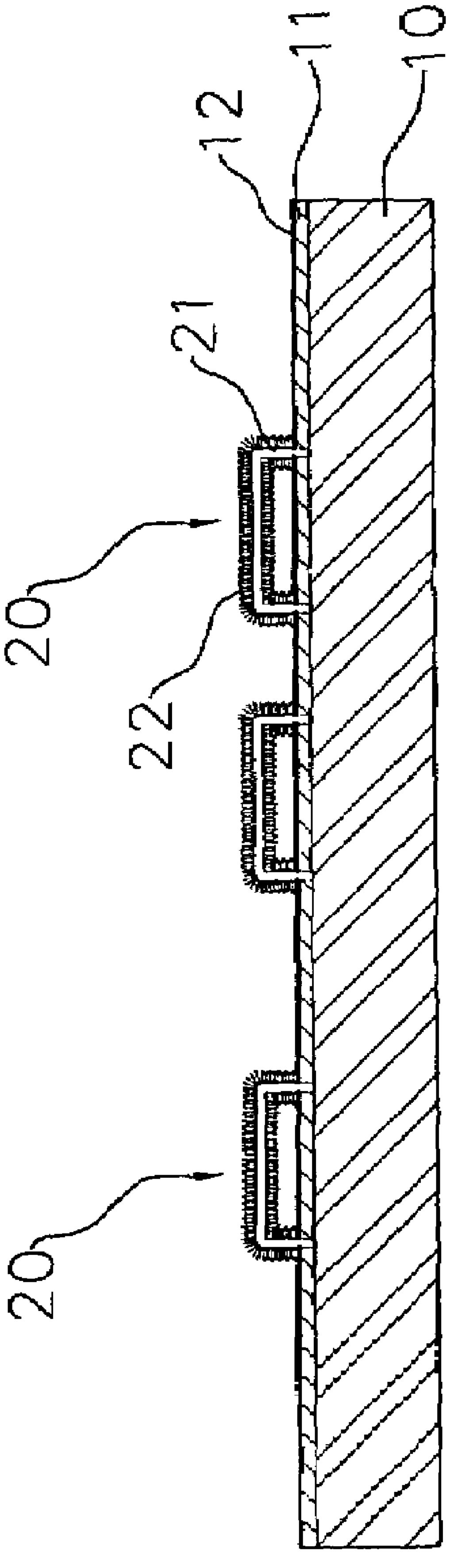
FIG. 2 is a bottom view in partial section of the vivid 3D illustrated card in FIG. 1.
Figure 3:
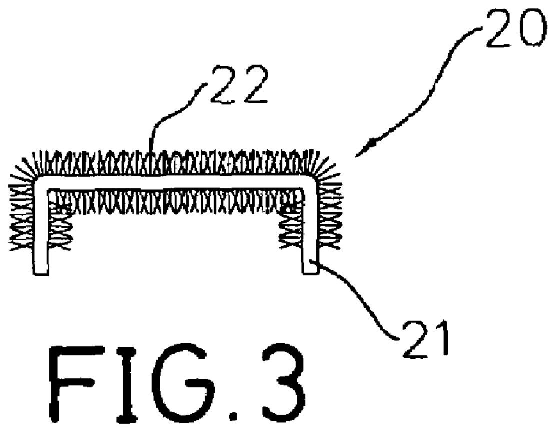
FIG. 3 is a bottom view of a first embodiment of a decoration for the vivid 3D illustrated card in FIG. 1.
Figure 4:
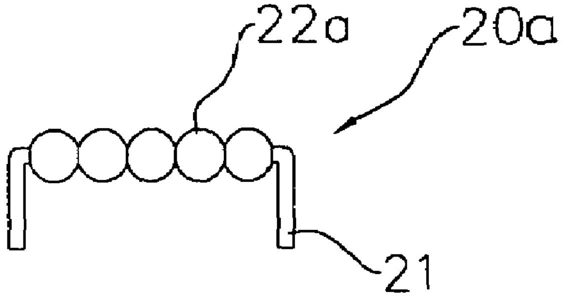
FIG. 4 is a bottom view of a second embodiment of a decoration for the vivid 3D illustrated card in FIG. 1.
Figure 5:
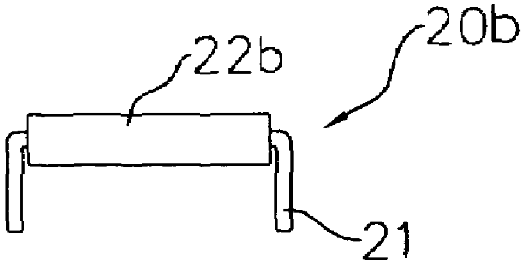
FIG. 5 is a bottom view of a third embodiment of a decoration for the vivid 3D illustrated card in FIG. 1.
Figure 9A:
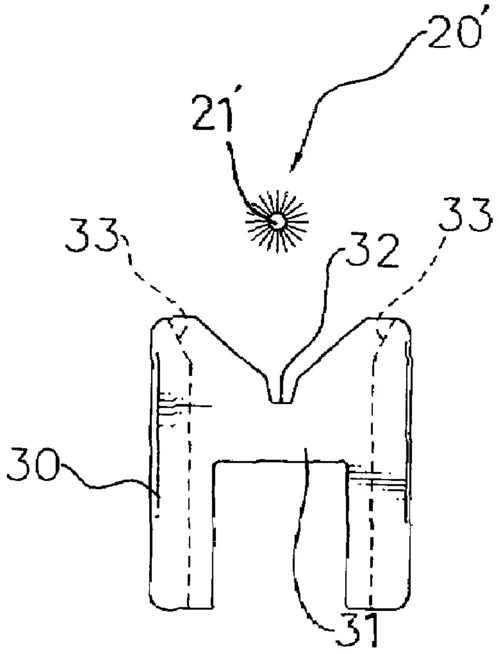
FIG. 9A is an operational front view of a semi-finished decoration aligned with the die mold in FIG. 7.

With reference to FIGS. 1, 2 and 3, a vivid 3D illustrated card comprises a base (10), a printed ink layer (11) and multiple decorations (20). The printed ink layer (11) is applied to the base (10) and has a colored pattern or characters. The decorations (20) are attached to the printed ink layer (11) on the base (10) and correspond respectively to parts of the patterns or characters. Each decoration (20) has a U-shaped wire (21) made of bendable material and a decorative element. A first embodiment of the decoration (20) has the decorative element being a fluff (22) mounted on the wire (21). With reference to FIG. 4, a second embodiment of a decoration (20*a*) has the decorative element being multiple colored beads (22*a*) mounted around the wire (21). With reference to FIG. 5, a third embodiment of a decoration (20*b*) has the decorative element being a colored tube (22*b*) mounted around the wire (21). With further reference to FIG. 9A, the decoration (20) is made by bending a straight wire (21') of a semi-finished decoration (20') into the U-shaped wire (21).

The die mold (30) of the vivid 3D illustrated card tool set has an open top, an open bottom, a front wall, a rear wall, two opposite sidewalls, a through hole (31), two notches (32), an optional inclined tool guide (33), two optional semi-finished decoration wire guides (35) and two optional decoration recesses (34).

Figure 7:
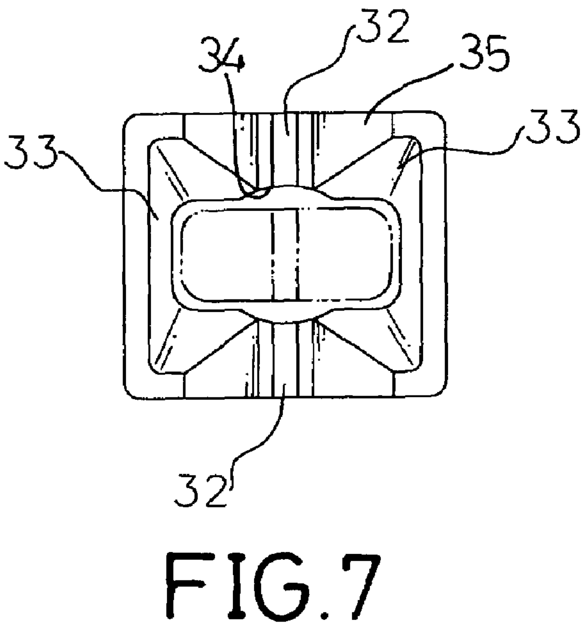
FIG. 7 is a top view of the die mold in FIG. 6.
Figure 9B:
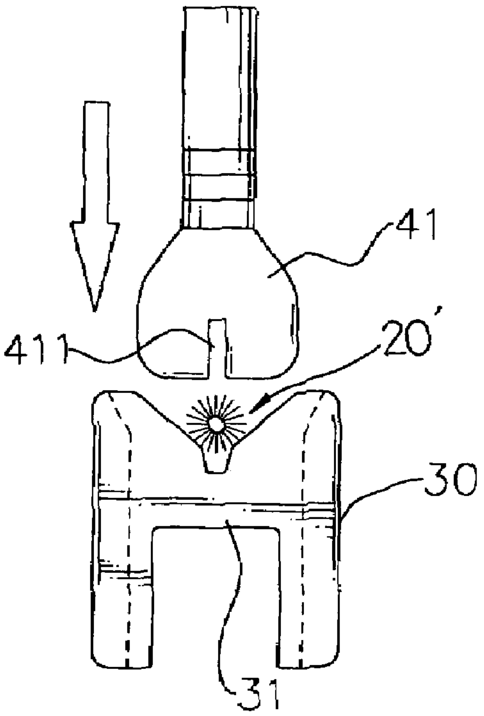
FIG. 9B is an operational front view of the hand-held tool in FIG. 8 aligned with the semi-finished decoration above the die mold in FIG. 9A.
Figure 9C:
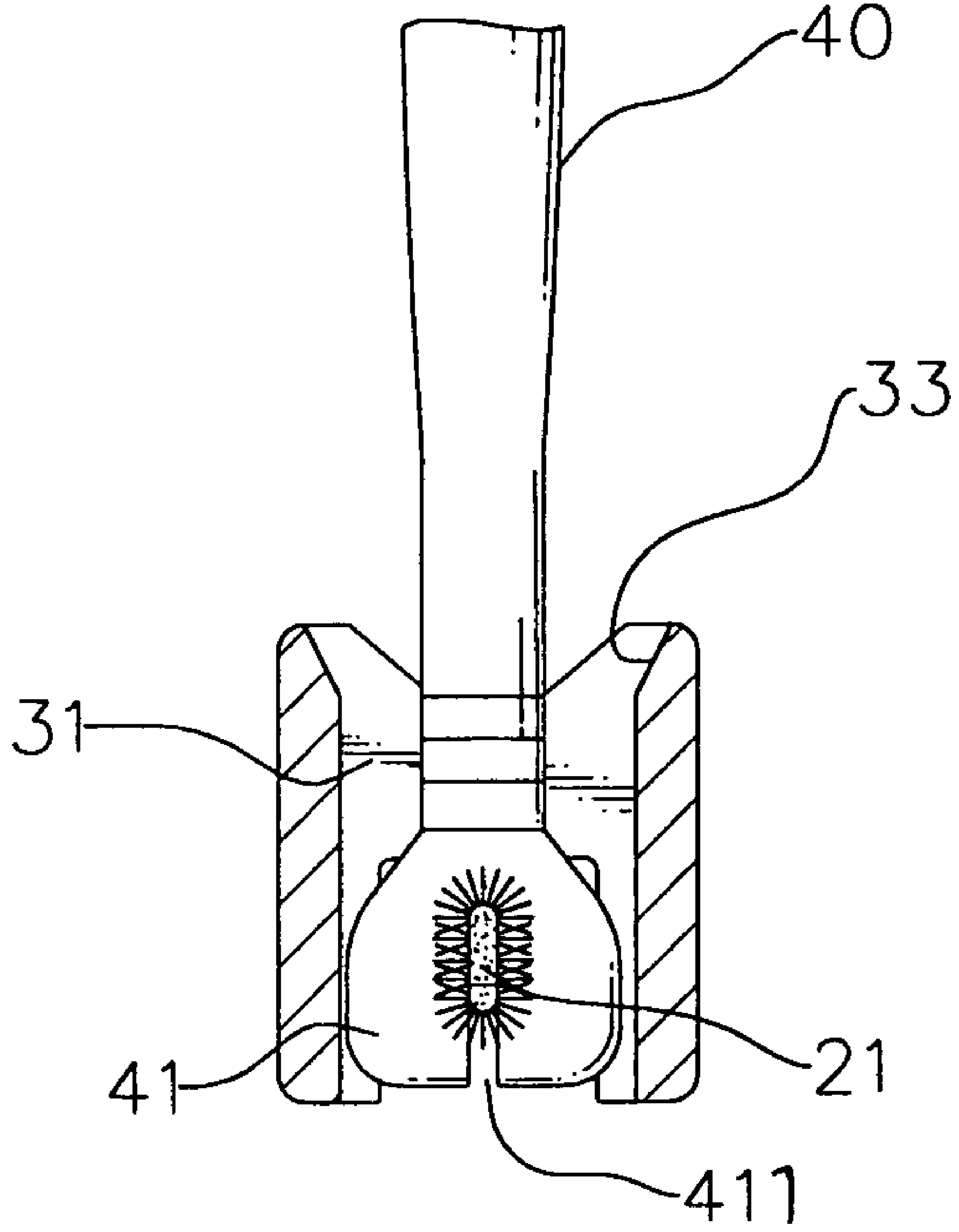
FIG. 9C is an operational front view in partial section of the hand-held tool pressed into the die mold and bending the decoration in FIG. 9B.

With further reference to FIG. 7, the open top has a top edge. The through hole (31) is defined vertically through the die mold (30) and communicates with the open top and the open bottom. With further reference to FIG. 9B and 9C, the notches (32) are defined in the top edge respectively in the front wall and the rear wall, are aligned with each other and correspond to the semi-finished decoration (20') to maintain the alignment of the semi-finished decoration (20') until the decoration (20) is bent. The inclined tool guide (33) is funnel-shaped and is defined in the top edge of the open top between the top edge and the through hole (31). The semi-finished decoration wire guides (35) guide a semi-finished decoration into the notches (32), are defined in the top edge of the open top respectively at the front and rear walls, are inclined inward from top to bottom and terminate respectively at the notches (32). The decoration recesses (34) allow a semi-finished decoration (20') to bend without binding in the die mold (30), are defined respectively inside the front wall and the rear wall in the through hole and face each other.

Figure 9D:
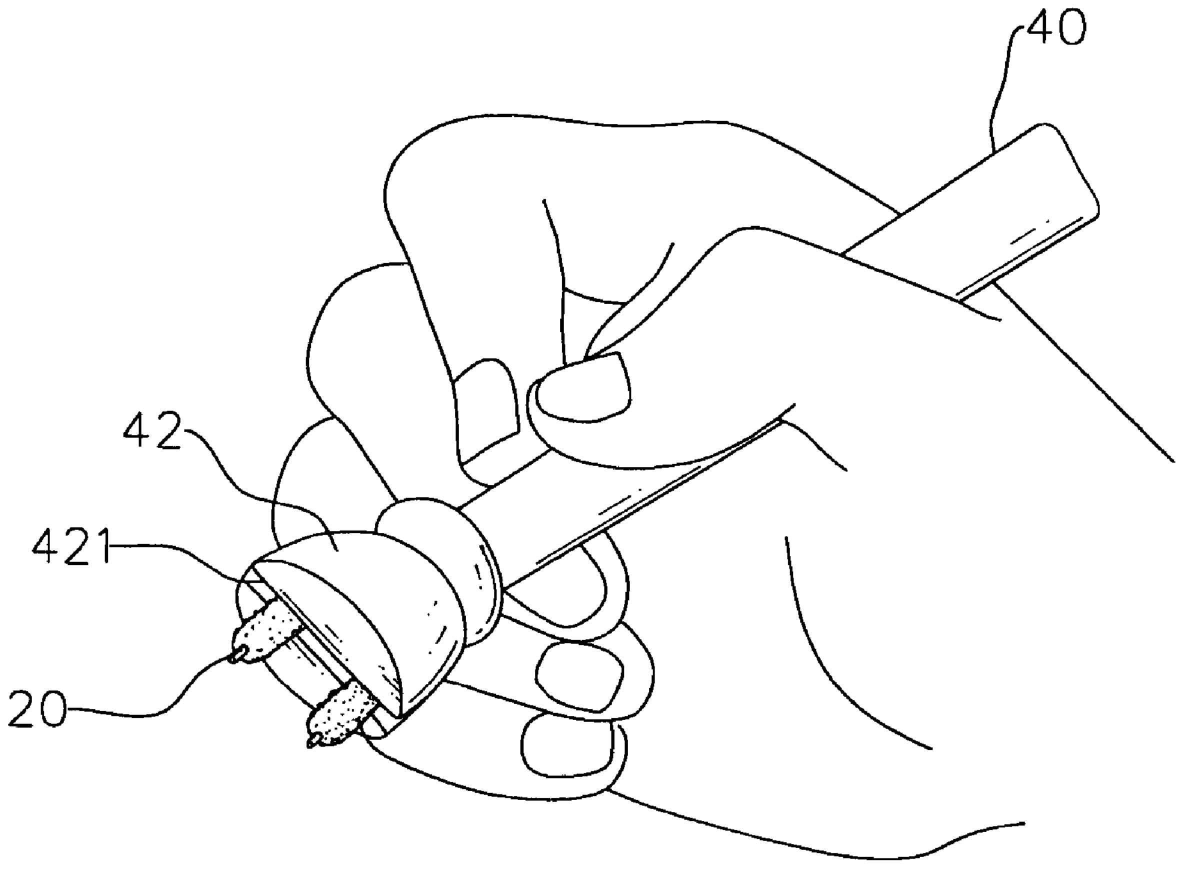
FIG. 9D is an operational perspective view of the hand-held tool in FIG. 8 holding a finished decoration.
Figure 9E:
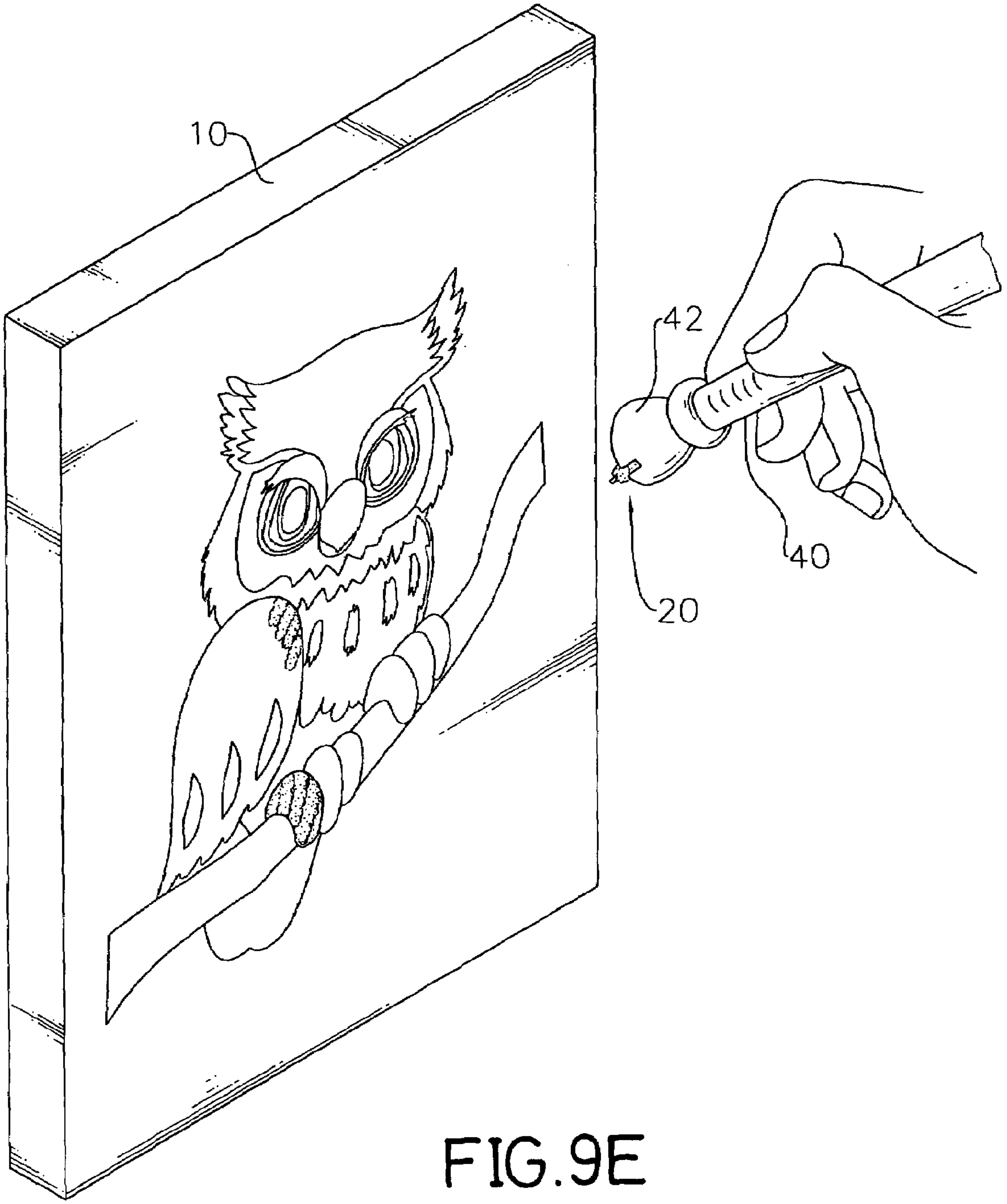
FIG. 9E is an operational perspective view of the decoration on the hand-held tool in FIG. 9D being attached to the printed ink layer on the base of an illustrated card.

The hand-held tool (40) of the vivid 3D illustrated card tool set has two ends, a bending die (41) and a clamp (42). The bending die (41) is formed on one end of the hand-held tool (40), corresponds to and passes through the through hole (31) in the die mold (30) to press the semi-finished decoration (20') in the top edge of the die mold (30) into the through hole (31). The bending die (41) has an alignment notch (411). The alignment notch (411) is defined transversely in the bending die (41) to hold a semi-finished decoration (20') until the finished product (20) is bent in the die mold (30). The clamp (42) is formed on the other end of the hand-held tool (40) and has a clamping notch (421). With further reference to FIGS. 9D and 9E, the clamping notch (421) is defined transversely in the clamp (42) to hold a decoration (20) when the decoration (20) is being attached to the illustrated 3D card.

The tool set quickly bends the semi-finished decoration (20') and attaches the finished decoration (10) tightly to the printed ink layer (11) on the base (10). The illustrated card with the decorations (20) looks vivid and attractive.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A vivid three-dimensional illustrated card tool set for bending a semi-finished decoration with a straight wire into a finished decoration with a bent wire and attaching the decoration to a printed ink layer on a base of an illustrated card, the tool set comprising:

a die mold having
- an open top having a top edge;
- an open bottom;
- a front wall;
- a rear wall;
- two opposite sidewalls; and
- a through hole defined vertically through the die mold and communicating with the open top and the open bottom; and a hand-held tool having
- a bending die corresponding to the through hole in the die mold; and
- a clamp for holding a decoration.

2. The tool set as claimed in claim 1, wherein the die mold further has two notches defined in the top edge respectively in the front wall and rear wall and aligned with each other to loosely hold the semi-finished decoration in the notches.

3. The tool set as claimed in claim 2, wherein:

the hand-held tool has two ends;

the bending die is formed on one end of the hand-held tool and has an alignment notch defined transversely in the bending die to hold a decoration inside the alignment notch; and the clamp is formed on the other end of the hand-held tool and having a clamping notch defined transversely in the clamp to hold a decoration inside the clamping notch.

4. The tool set as claimed in claim 3, wherein the die mold further has an inclined tool guide being funnel-shaped and defined in the top edge of the open top between the top edge and the through hole.

5. The tool set as claimed in claim 4, wherein the die mold further has two semi-finished decoration wire guides defined in the top edge of the open top respectively at the front and rear walls, inclined outwardly from bottom to top and terminating respectively at the notches.

6. The tool set as claimed in claim 5, wherein the die mold further has two decoration recesses defined respectively inside the front wall and the rear wall in the through hole and facing each other.

* * * * *